(12) United States Patent
Annangi

(10) Patent No.: US 7,415,635 B1
(45) Date of Patent: Aug. 19, 2008

(54) INTEGRATED SOFTWARE TEST FRAMEWORK FOR PERFORMANCE TESTING OF A SOFTWARE APPLICATION

(75) Inventor: Suneetha Annangi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 11/013,503

(22) Filed: Dec. 15, 2004

(51) Int. Cl.
*G06F 11/00* (2006.01)
(52) U.S. Cl. .............................. 714/38; 714/25; 717/124
(58) Field of Classification Search .................. 714/38, 714/25; 717/124
See application file for complete search history.

(56) References Cited

U.S. PATENT DOCUMENTS

| | | | | |
|---|---|---|---|---|
| 5,905,856 | A * | 5/1999 | Ottensooser | 714/38 |
| 5,960,196 | A * | 9/1999 | Carrier et al. | 717/122 |
| 6,983,400 | B2 * | 1/2006 | Volkov | 714/38 |
| 7,127,641 | B1 * | 10/2006 | Anderson | 714/38 |
| 2002/0059561 | A1 * | 5/2002 | Foster et al. | 717/126 |
| 2003/0070119 | A1 * | 4/2003 | Dallin | 714/38 |
| 2004/0015846 | A1 * | 1/2004 | Haisraeli | 717/115 |
| 2004/0044993 | A1 * | 3/2004 | Muller et al. | 717/124 |
| 2004/0204894 | A1 * | 10/2004 | McGrath et al. | 702/119 |

\* cited by examiner

*Primary Examiner*—Marc Duncan
(74) *Attorney, Agent, or Firm*—Merchant & Gould, P.C.

(57) ABSTRACT

In accordance with the present invention, the above and other problems are solved by an integrated test framework that can receive measurement commands from a test script, automatically configure and execute any performance metrics required to effectuate the measurements and further manage the operation of the software to be tested. The integrated test framework can interpret script commands directed at any testing tool in a testing tool library accessible to the framework. Furthermore, the integrated test framework can identify and utilize code markers during the testing of software applications that utilize embedded code markers as well as identifying script markers. Thus, the integrated framework allows testing scenarios to be created incorporating both code markers and script markers to control performance testing of the executing software application.

21 Claims, 8 Drawing Sheets

```
using System;
using System.Windows.Forms;
using MS.Internal.Test.Automation.Office.Context;
using MS.Internal.Test.Automation.Office.Runtime;
using MS.Internal.Test.Automation.Office.TestClasses;
using System.Threading;

// Office performance
using MS.Internal.Test.Automation.Office.Performance;

// Word PIA
using Microsoft.Office.Interop.Word;

// Office logging
using MS.Internal.Test.Automation.Office;

namespace Office
{
    /// <summary>
    /// Summary description for Class1.
    /// </summary>
    public class WordTest01 : OfficeTestClass
    {
        #region Constructor private ApplicationClass objHost;
        private PerformanceMeasurer perfObject;
        private object missing = Type.Missing;
        private object fileName = @"c:\complex.doc";
        private object newFileName = @"c:\delete.doc";

public WordTest01()
        {
            // Empty here for performance tests
        }
        #endregion
        #region Setup and Teardown Methods
        [Setup]
        public void Setup()
        {
            perfObject = new PerformanceMeasurer("Word-Test");

// Boot Word
            try
            {
                // Measure word boot using Script-to-application testing
                perfObject.StartMeasurement("WordBoot",0,1,501,1,0,0);
                //Boot Word Action
                this.objHost = new ApplicationClass();
                this.objHost.Visible = true;
                this.objHost.ScreenUpdating = true;
                perfObject.EndMeasurement("WordBoot",5);
                Log.Pass("Test complete!");
            }
            catch (Exception e)
            {
                Log.Fail("Failed to boot Word, with error message " + e.Message);
            }
        }
```

```
[Teardown]
public void Teardown()
{
    // Quit Word
    object objSaveChanges = WdSaveOptions.wdDoNotSaveChanges;
    // measure Word Quit using Script-to-script method
    perfObject.StartMeasurement("WordQuit");
    this.objHost.Quit(ref objSaveChanges, ref this.missing,
            ref this.missing);
    perfObject.EndMeasurement("WordQuit");

// Close perfObject
    perfObject.Close();
    // Dispose perfObject
    Thread.Sleep(5000);
    perfObject.Dispose();

Log.Pass("Test complete!");
}
endregion region Test Steps

[Step(1)]
[Description("Open Complex.doc")]
public void OpenComplexDoc()
{
    // Open Complex.doc
    this.Log.Comment("OpenComplexDoc -- Word is opening Complex.doc");
    object myTrue = true;
    Thread.Sleep(3000);
    MessageBox.Show("Open complex.doc");
    // measuring Word Open using Application-to-applicatin method
    perfObject.StartMeasurement("WordOpen", 503, 1, 504, 1, 0, 0);
    this.objHost.Documents.Open(ref fileName, ref missing, ref myTrue,
                    ref missing, ref missing,
                    ref missing, ref missing, ref missing,
                    ref missing, ref missing, ref missing,
                    ref missing, ref missing, ref missing,
                    ref missing, ref missing);
    perfObject.EndMeasurement("WordOpen", 5);

Thread.Sleep(3000);
    //this.objHost.Documents.Open
    this.Log.Pass("Open Complete!");
}

[Step(2)]
[Description("Save Complex.doc to delete.doc")]
public void SaveComplexDoc()
{
    this.Log.Comment("Type in some text to make the document dirty");
    //Type in some text
    string text = ("This Document is now dirty....");
    this.objHost.Selection.TypeText(text);
    Thread.Sleep(3000);
    // measuring Word Open using Application-to-script method
    perfObject.StartMeasurement("WordSave", 507, 1, 0, 1, 0, 0);
    this.objHost.ActiveDocument.SaveAs(ref newFileName, ref missing,
                    ref missing, ref missing, ref missing,
                    ref missing, ref missing, ref missing,
                    ref missing, ref missing, ref missing,
                    ref missing, ref missing, ref missing,
                    ref missing, ref missing);

perfObject.EndMeasurement("WordSave");
    this.Log.Pass("Save Complete!");

}
endregion
}
```

INTEGRATED SOFTWARE TEST FRAMEWORK FOR PERFORMANCE TESTING OF A SOFTWARE APPLICATION

TECHNICAL FIELD

This application relates generally to testing software and more particularly to an integrated software test framework.

BACKGROUND OF THE INVENTION

Software, such as programs or applications, must be tested after each substantial revision to determine if the changes in the new version might have detrimentally affected the operation of the software due to unanticipated conflicts or errors. Software testers utilize a number of testing tools to evaluate the performance of new versions and to identify the source of any problems they may find. Examples of commonly used testing tools include a benchmarking tool (a tool that can determine the time durations of a specific action, call, or other identifiable point in the execution of a software application occurs), a profiling tool (a tool that identifies the sequence of the calls or application programming interfaces (APIs) that are being used, what functions are being called, and when they are used during execution of a software application), a working set tool (a tool that tracks various measurements related to memory, disk cpu usage during execution of a software application), a communication tracking tools (like remote procedure call, or RPC, Bytes over the Wire"—a tool that counts the number of bytes transmitted over the network, etc), a file monitoring tool (a tool that tracks the creation and use of files during the execution of a software application), a registry monitor (a tool that records what registry components were accessed) and a network latency tool (a tool that measures the time it takes for communication between a sender and receiver over the network). In addition to these commonly used tools, a software tester may also use other tools that are specific to the software being tested.

Testing software is a tedious process that must be repeated after each revision. Oftentimes, performance testing starts with a benchmarking test. If the results of the benchmarking test indicates that performance of the software is not as anticipated, then additional software tests are typically performed, this time with one or more testing tools until the source of the problem is identified so that the problem can be corrected.

Each test of the software requires the tester to develop a test scenario in which the tester identifies each testing tool or tools to be used, what data each tool will track, and what operational scenario the software should perform. For example, take the situation in which a software tester finds that a new version of a word processor application fails a benchmarking test indicating that the combined operation of saving a document and closing the application is too slow. Next the tester will have to develop a second test, in which the time the "save" command is received, the time the document is saved and the time the application closes are recorded. After these times are recorded, a third test may be developed and run to that identify what calls are being made and the time duration of each call. This test will identify the call that is the source of the delay. After the delaying call is identified, additional tests focused on the call must be developed in order to ultimately diagnose the source of the delay.

To be used, testing tools typically require the tester to write a test script that identifies the software to be tested, the scenario to be tested, and what tests to perform. More importantly, the test script must also configure the testing computer to support the particular testing tool required, register and execute the testing tool and, if necessary, identify the exact measurements desired. In order to do this, a tester must have knowledge of the specific configuration requirements for each testing tool and the testing computer. The tester must also understand the specific script commands necessary for each testing tool.

The test script is then executed and the test data is saved or printed to the screen as directed in the script. In the above example, the test script for the second test would have been written that identified the application and included the "Save and Exit" command. The script would also have included a command to initialize the benchmarking testing tool and commands to record the time at the save call, the receipt of save confirmation, and at the application close.

In addition to the commands written in a test script (e.g., initialize a testing tool, run a software application and execute a specified series of actions, record the time of an action, or identify the active objects during a specific period), a test will include "markers" that identify points during the execution of the software application. Markers are typically used as part of a command that directs a testing tool to take a measurement, or begin or end taking measurements. There are two types of markers: code markers and script markers.

To assist testers, some software applications are written with testing in mind and include embedded "code markers" that a tester can use when analyzing performance. For example, common benchmarking points in a software such as "receipt of document save command", "receipt of print command", "receipt of close command", "receipt of document open command", as well as internal status code markers such as "document saved", "print complete", "document closed", etc. may be provided in a software application to facilitate testing. Code markers may be used in a test script to direct the measurements taken by a testing tool, but only if the script and testing tool are designed to take advantage of them. Code markers are very helpful as they provide very exact feedback from known points in the software application itself. However, these code markers are typically sparingly used as they remain in the software after distribution and increase the amount of code that must be stored.

Script markers are markers that can be placed in the script and that identify points during the execution of an application without using internally embedded markers. Script markers are not as precise as code markers as there may be a delay between an actual occurrence of an action and the detection of the action by the testing tool. However, script markers are very useful in situations where there is no code marker or in situations where a scenario is being tested involving the interaction between two software applications which have the same code markers.

The drawbacks of the current software testing methods are many. First, testing is very time consuming because current methods are iterative and, oftentimes each iteration involves the development and execution of a separate script. In addition, a test script must be written for each metrics (like benchmark, working set etc. . . . ) by the tester and executed separately and each time the test script is executed the software being tested is executed. Another drawback is that the test results must be correlated and evaluated by hand to determine where the problem is. Another drawback is that if the testing tool is not written to utilize code markers, then only script markers may be used. Yet another drawback is that if the problem being diagnosed is intermittent, then one or more of the separate executions may not exhibit the problem. A similar problem occurs if the underlying execution framework changes behavior (i.e., is slower in execution of the application) for external reasons between different tests, which can possibly lead to a misdiagnosis of the problem.

SUMMARY OF THE INVENTION

In accordance with the present invention, the above and other problems are solved by an integrated test framework that can receive measurement commands from a test script, automatically configure and execute any performance metrics required to effectuate the measurements and further manage the operation of the software to be tested. The integrated test framework can interpret script commands directed at any testing tool in a testing tool library accessible to the framework. Furthermore, the integrated test framework can identify and utilize code markers during the testing of software applications that utilize embedded code markers as well as identifying script markers. Thus, the integrated framework allows testing scenarios to be created incorporating both code markers and script markers to control performance testing of the executing software application.

In accordance with still other aspects, the present invention relates to a method of testing a software application using an integrated test framework. The method includes executing a test script that identifies the software application to be tested and a plurality of measurements, wherein each measurement is associated with one of a set of testing tools. In response to executing the test script, the software application is executed, such as by loading it into memory and/or preparing it to perform the scenario to be tested, and the integrated test framework is initiated, again such as by instantiating an object of the test framework class or executing/loading into memory a test framework software application. The integrated test framework then initiates each of the testing tools associated with the plurality of measurements identified in the test script and directs the initiated testing tools to perform their associated measurements. The testing tools perform the measurements and return data to the integrated test framework. The integrated test framework receives the data from testing tools performing measurements and stores data generated from the received data as a data collection associated with the test script.

In accordance with still other aspects, the present invention relates to a second method of testing a software application with an integrated testing framework. The method includes receiving, by the integrated testing framework, one or more commands to perform measurements in conjunction with execution of the software application. The integrated test framework identifies one or more performance testing tools from a set of testing tools, the identified one or more testing tools necessary to perform the measurements and initiates them.

In accordance with other aspects, the present invention relates to a software testing system that includes a plurality of testing tools and an integrated testing framework. The integrated testing framework operable to identify testing tools from measurement requests in a test script and execute the identified testing tools based on the measurement requests. The integrated testing framework being further operable to receive data from each of the testing tools, collect the data into a data collection, and stores the data collection in a data structure.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 5*a* and 5*b* illustrate a test script for use by the integrated test framework in accordance with an embodiment of the present invention.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In general, embodiments of the present invention may be considered as an integrated test framework that allows software testers to measure the performance of any given scenario from a single test script. Software performance testing refers to acts of gathering data on performance metrics related to the operation of the software application. Software performance metrics include the time specific actions, calls, or transmissions were made, what actions, calls, transmissions were made, what components such as objects and data elements were utilized, what APIs were called and when, what hardware resources, such as memory and data storage were utilized, and any other aspect of the operation of the software application to be tested.

Figure 1:
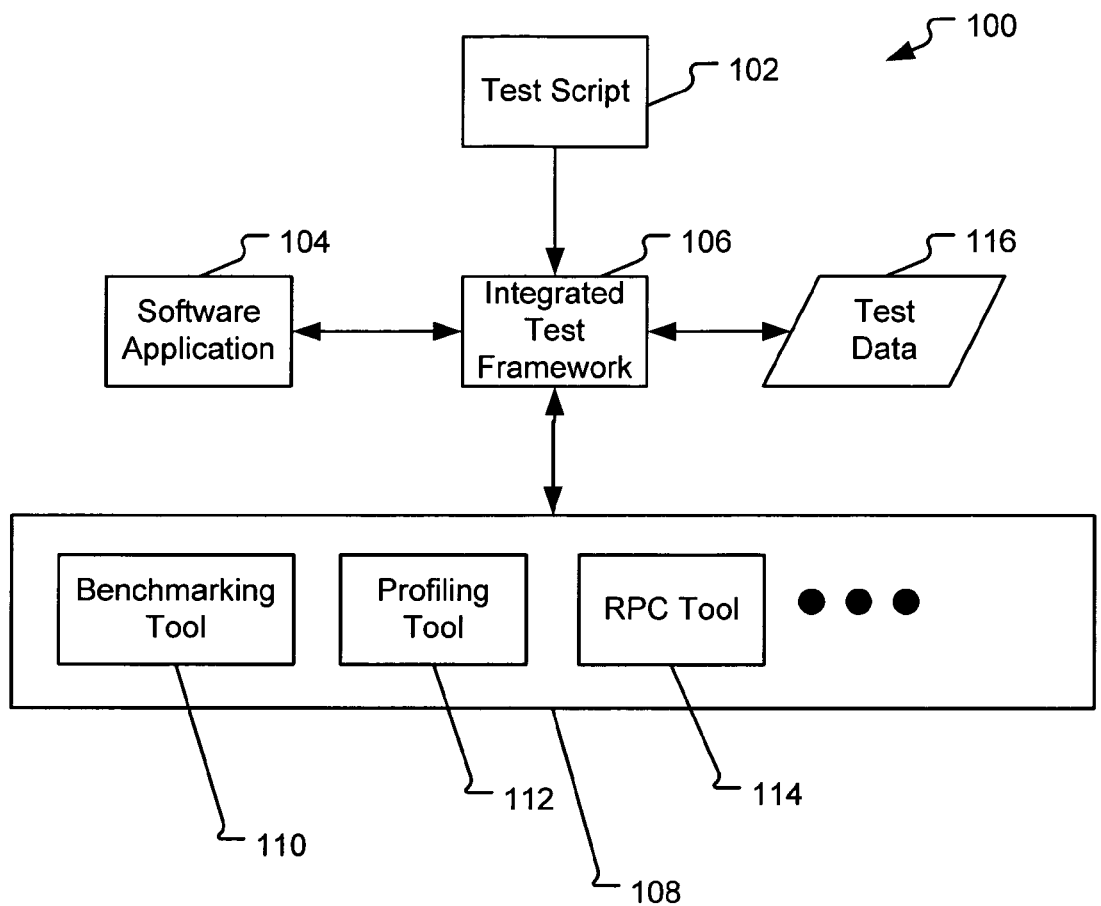
FIG. 1 illustrates, at a high, conceptual level, a computer architecture for testing software applications, the computer architecture including an integrated test framework in accordance with an embodiment of the present invention.

FIG. 1 is a high-level, conceptual illustration of a computing architecture 100 for testing software application in accordance with an embodiment of the present invention. FIG. 1 shows a test script 102 that may be executed to test performance of a software application 104 using one or more available testing tools 110, 112, 114 contained within a testing tool library 108. The test script 102 is an executable script that identifies a software application to be tested and also any measurements to be executed concurrently with the software application 104.

Execution of the test script 102 causes the execution of the software application 104. If the test script identifies a series of operations to be performed by the software application 104, such as open, print, and close a document scenario, these operations are executed as directed by the test script. Thus, the test script 102 may cause the software application 104 to perform any scenario of interest to the tester. In some embodiments, the software application 104 may need to be modified to allow for control via the test scripts, a process referred to as "automation."

In an embodiment, the computer architecture 100 includes an integrated test framework 106. The test script 102 causes the execution of the integrated test framework 106. The integrated test framework 106 could alternatively be referred to as a "test management application" or a "test manager." The integrated test framework 106 may be considered an independent test manager software application that can configure, register, execute, and may control the operation of the available independent testing tools 110, 112, 114. The integrated test framework 106 is referred to herein as a "framework" rather than an application to differentiate it from the software application 104 being tested and also because in most of the embodiments described the integrated test framework 106 operates in the background, without direct user interaction, for the purpose of managing the operations of testing tools 110, 112, 114 during the execution of the software application 104 being tested.

Generally, testing tools refers to software applications designed to gather performance metrics from another software application, such as software application 104. Testing tools 110, 112, 114 may be executed concurrently with the software application 104 to be tested or may be executed before or after and act on the software application 104 to be tested. FIG. 1 illustrates three exemplary testing tools, a benchmarking tool 110, a profiling tool 112, and a RPC tool 114. However one skilled in the art will understand that the library 108 may include any software testing tool, such as for example a file monitor or a registry module (not shown).

The integrated test framework 106 can also interpret script markers identifying measurement commands within the test script 102 to identify and execute any one or more of the testing tools 110, 112, 114 contained in the testing tool library 108. In order to do this, the integrated test framework 106 is also capable of configuring the testing computer (not shown) to support the execution of any of the testing tools 110, 112, 114 necessary to perform the measurements identified in the test script 102. The integrated test framework 106 can further interpret script markers in the test script to cause any executing testing tools 110, 112, 114 to measure any performance metric or perform any test action that they are capable of.

The integrated test framework 106 is further capable of receiving any data output from any executing testing tools 110, 112, 114, translating the data into a common form, and collecting the data into a single test data collection 116, which may then be displayed to a user, stored in a data store, or analyzed by the integrated test framework 106.

Analysis of the data in the test data collection 116 by the integrated test framework 106 may be performed automatically or in response to information provided in the test script. Based on the results of the analysis, additional testing may be performed such as repeating execution of the software application 104 with a different set of measurements.

Figure 2:
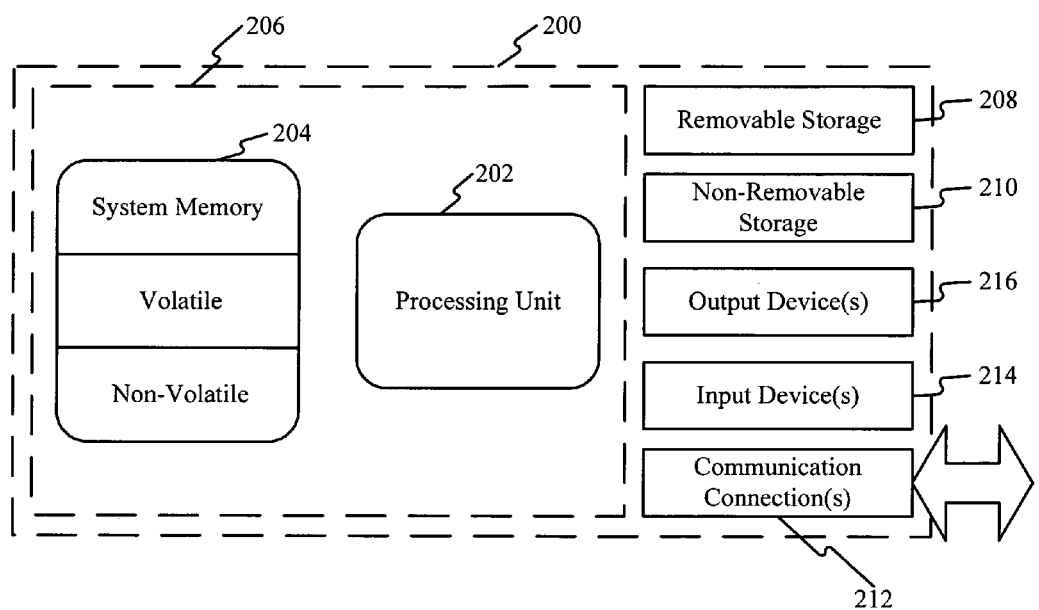
FIG. 2 shows an exemplary computer system upon which embodiments of the present invention may be implemented.

An embodiment of a suitable operating environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. These devices, either individually or in combination can form a user interface. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing device 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
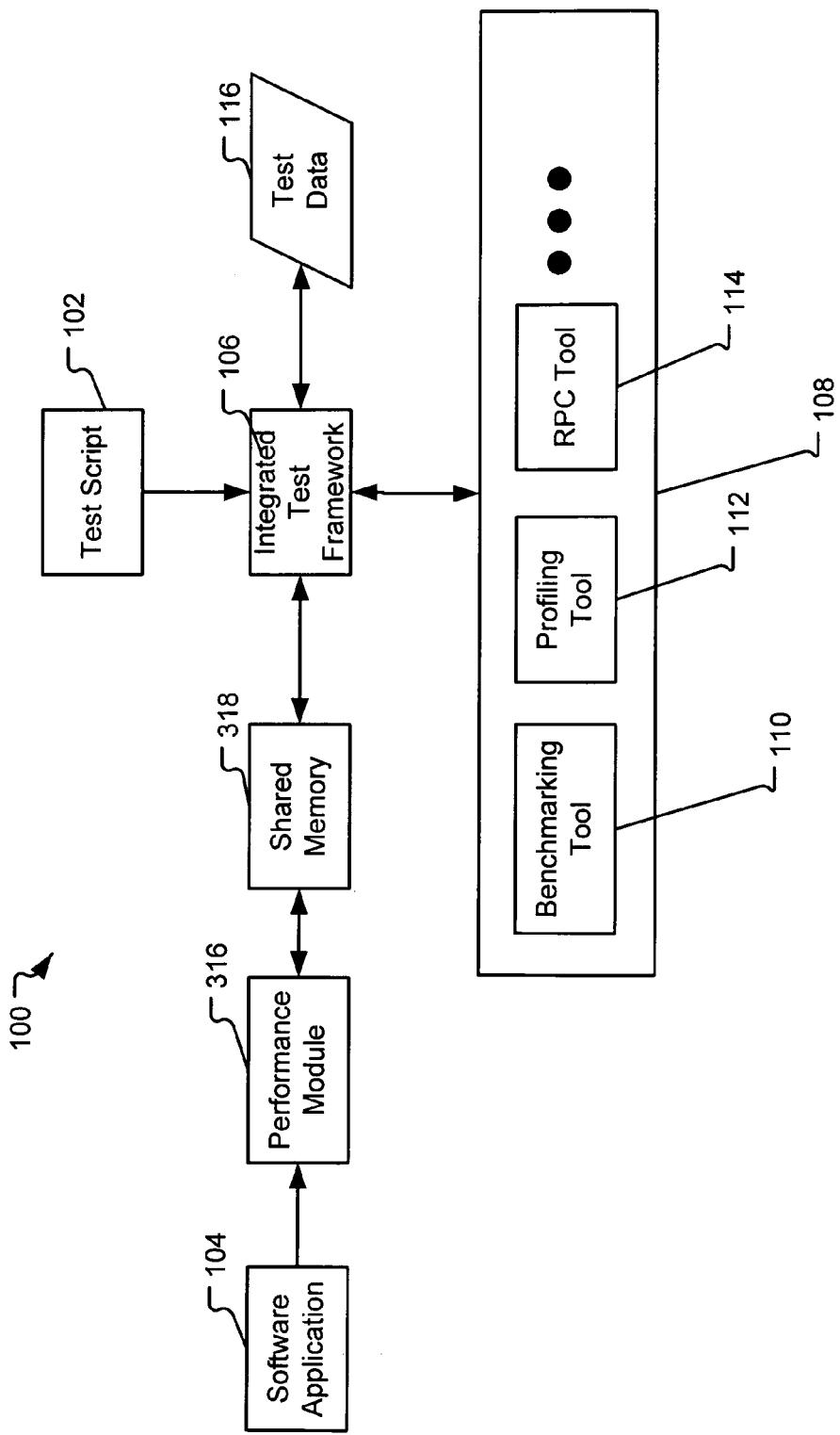
FIG. 3 illustrates the computing architecture shown in FIG. 1 in more detail in accordance with an embodiment of the present invention.

FIG. 3 illustrates the computing architecture 100 of FIG. 1 in more detail in accordance with an embodiment of the present invention. The computer architecture 100 shown in FIG. 3 includes the test script 102, the software application 104 to be tested using the test script 102, the integrated test framework 106, and the library 108 of testing tools 110, 112, 114. Except as described below, these architectural elements operate as described above with reference to FIG. 1.

The software application 104 is provided with code markers to facilitate testing of the software application 104 in accordance with an embodiment of the present invention. As discussed above, code markers are elements of code embedded in the software application 104 for the purpose of obtaining exact measurements of when specified operations occur during the execution of the software application 104. Each code marker is specific to a different operation in the software application 104, e.g., opening a document operation or printing a document operation.

In addition to those elements described above, the computer architecture 100 also includes a performance module 316 and a shared memory 318. The performance module 316 must be loaded into computer memory (i.e. instantiated) in order to obtain any measurements related to the code markers. When a code marker is encountered during execution of the software application 104, the performance module 316 receives and captures this information directly from the application 104. For example, in one embodiment the code markers takes the form of API calls to the performance module 316 and the performance module 316 is a dynamic link library (DLL) which must be loaded into computer memory in order to receive the calls. In one embodiment, the performance module 316 is loaded by the software application along with the other DLLs necessary for the software application 104 to execute. In an alternative embodiment, the performance module may be loaded by the integrated test framework 106 in response to a script marker or by default whenever the integrated test framework 106 is executed.

In an embodiment, the performance module 316 receives information concerning every code marker encountered during execution of the software application 104. In order to limit the amount of measurement data generated by the performance module 316 during a test, the data output by the performance module 316 may be limited to specified code markers by means of the shared memory 318. In an embodiment, the shared memory 318 may be created as part of initiating the performance module 316 or it may be created by the integrated test framework 106. The performance module 316 accesses the shared memory 318 to determine what code markers are of interest during any given test. When the performance module 316 is loaded, it inspects the shared memory 318 for code markers. Subsequently, for each code marker listed in the shared memory 318, the performance module 316 generates measurement data, for example the time the code marker is encountered, related to that code marker.

In accordance with an embodiment of the present invention, the data generated by the performance module 316 is output to the shared memory 318. In an alternative embodiment, the data generated by the performance module 316 may be output to any location or data file accessible to the integrated test framework 106.

The shared memory 318 is also accessible by the integrated test framework 106. In one embodiment, the integrated test framework 106 originally populates the shared memory with the code markers of interest as determined from an inspection of the test script 102 and also obtains data generated by the performance module 316 from the shared memory. Thus, in this embodiment the shared memory 318 may be considered a conduit for communication between the performance module 316 and the integrated test framework 106.

In order for the integrated test framework 106 to identify the code markers in a test script, the integrated test framework 106 maintains a code marker list 320 of code markers for the software application. In addition to providing information that allows the integrated test framework to identify code markers in the test script, the code marker list 320 may include information necessary to translate a code marker into a form that should be written to the shared memory 318 that is understandable by the performance module 316.

Figure 4:
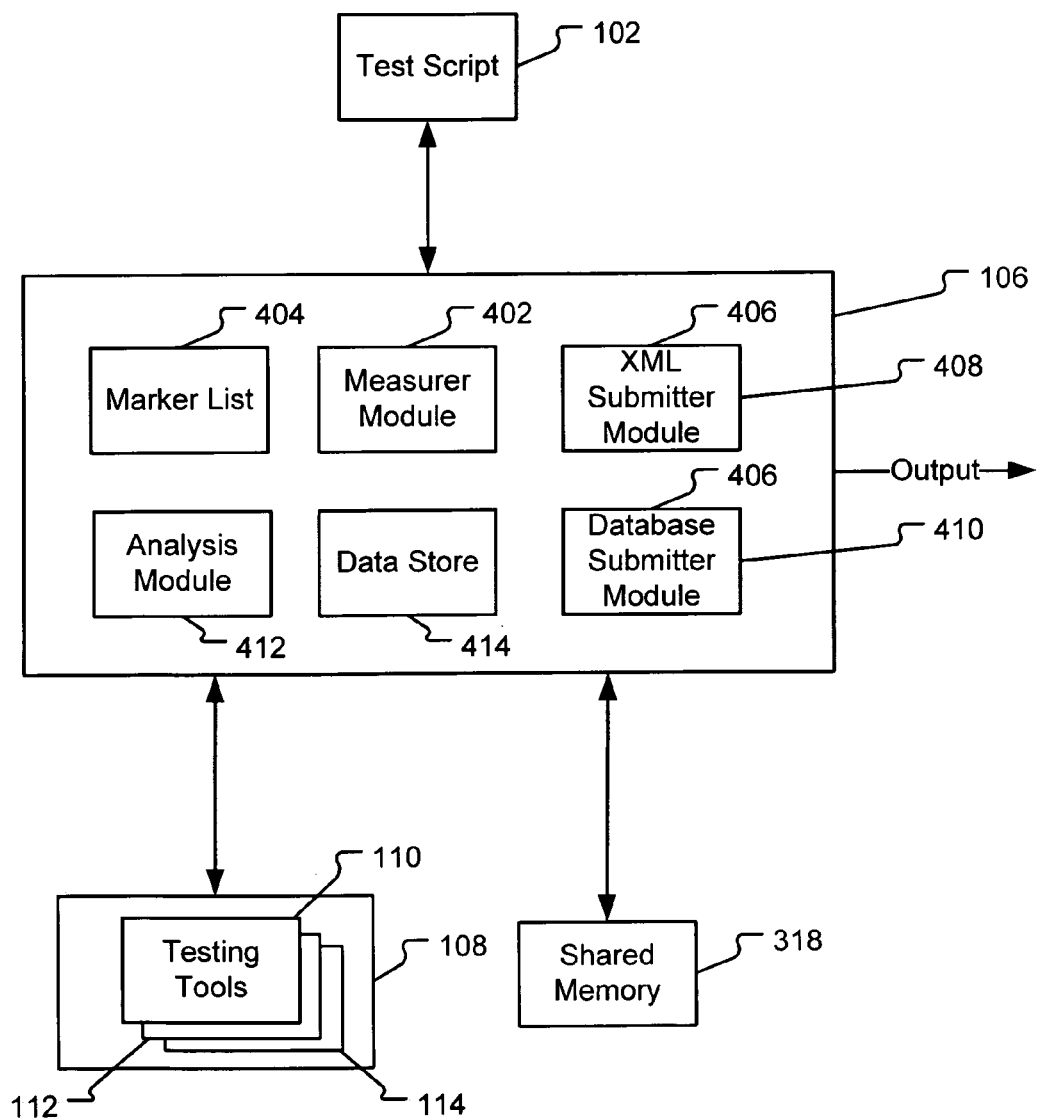
FIG. 4 illustrates the integrated test framework shown in FIGS. 1 and 3 in more detail in accordance with an embodiment of the present invention.

FIG. 4 illustrates components of the integrated test framework 106. The integrated test framework 106 includes a measurer module 402. The measurer module 402 includes the logic necessary to configure, collect and support the operation of the testing tools 110, 112, 114 available to the framework 106. In order to perform this function, the integrated test framework may include or have access to one or more data stores 414 of configuration data related to the testing tools. The data stores 414 may be included with the integrated test framework as shown or alternatively may be maintained as part of each of the testing tools or in another location such as a system registry. The measurer module 402 includes the logic necessary to interpret the configuration data and subsequently configure the computing environment to allow the testing tool to execute as necessary to obtain the measurements from the software application being tested.

The measurer module 402 also supports the identification of the script markers and code markers, if any, within test scripts. To support the identification, the measurer module 402 has access to a marker list 404 that may or may not be a separate data store 414. The marker list 404 includes the data necessary to identify markers in the test script 102. The marker list 404 may also provide information that correlated the markers as they are found in the script with other forms of markers, such as the form in which a specific code marker must be written to shared memory 318, for example.

In an object-oriented programming environment embodiment, such as Microsoft's NET framework, the measurer module 402 may be implemented as a NET base class, e.g., PerformanceMeasurer class. This class is then instantiated by the test script and subsequently manages the testing process as described above. This implementation further allows for easy development of testing tools as each testing tool can then inherit from the PerformanceMeasurer base class. In this way, all logic common to each testing tool can be located in the base class to facilitate ease of development of testing tools.

The integrated test framework 106 also includes a submitter module 406. The submitter module 406 supports the collection of data from the various testing tools. The submitter module 406 also supports outputting the data in a specified form to a specified location, such as in a database format to a database, in ASCII to the screen, or in .XML to a specified file. In the present embodiment, the integrated test framework 106 has access to multiple submitter modules 406, each module 406 supporting a different output format and location, e.g., an .XML submitter 408 and a database submitter 410. In an alternative embodiment, the integrated test framework 106 may have one submitter module 406 that supports all potential output scenarios. A tester can dictate the submitter module 406 to be used for a particular test by specifying a submitter module 406 in the test script. In an embodiment, if no submitter module 406 is specified a default submitter module is used.

In an object-oriented programming environment embodiment, such as Microsoft's NET framework, the submitter module 406 may be implemented as a .NET base class, e.g., PerformanceSubmitter class. This allows for easy development of submitters as each submitter tool can then inherit from the PerformanceSubmitter base class. In this way, all logic common to each submitter module 406 can be located in the base class to facilitate ease of development of additional submitter modules 406.

The integrated test framework 106 may also include an analysis module 412. The analysis module 412 is capable of analyzing data generated by the testing tools and compare that data with other performance criteria, such as previous testing results, or predetermined performance thresholds. The analysis module 412 may obtain the performance criteria from the test script or by accessing a data store 414 maintained to include performance criteria. The analysis module 412 may perform analyses in response to commands placed in the test script 102 (possibly including or identifying the performance criteria to be used in the test) or may perform predetermined analyses for every test or both. In response to the analysis, the analysis module 412 is capable of performing additional actions such as returning information that then directs the integrated test framework 106 to perform additional tests, either as described in the test script or a modified version of the tests in the test script. For example, if the analysis module 412 determines that a test fails a benchmarking analysis, the test may be automatically repeated without the tester's interaction, but using the profiling testing tool 112 in addition to the benchmarking testing tool 110.

The directions of how to modify the test scenario in the event that the analysis fails may be explicitly provided in the script. For example, the analysis module may return or maintain an analysis failed indication that is referenced in the test script. In that embodiment, the tester can draft a test script that includes an if-then-else statement in the script explicitly describe what scenario to perform based on the results of the first analysis. In an alternative embodiment, a repeat test command could be used in the script that, based on the results of the analysis, would direct the integrated test framework 106 to repeat the initial test using different testing tools identified in the repeat command.

FIGS. 5a and 5b contain an exemplary code listing for test script 102 for use in the computer architecture 100 in accordance with an embodiment of the present invention. FIG. 5a contains approximately the first half 102a of the exemplary code listing for the test script 102. FIG. 5b contains the second half 102b of the code listing. The first portion of the code listing includes namespace identifications 502 which are well known in the art with respect to NET programming. In general, the test script 102 identifies the software application or applications to be tested and the specific scenario to be tested, i.e., series of operations to be performed by the software application. In the exemplary embodiment shown, the application is identified in the first portion 502 by the namespace specification "using Microsoft.Office.Interop.Word. This namespace specification identifies the software application "Word." The series of software application operations tested are identified within the "public void" functions in the code listing. For example, the function "public void OpenComplexDoc( )" includes a command "this.objHost.Documents.Open( . . . )" that causes the software application's automation module to open the identified file.

After the namespace specifications, the test script includes a command that instantiates the integrated test framework. In the embodiment shown, the command "perfObject =new PerformanceMeasurer ("Word-Test")" instantiates an object of the PerformanceMeasurer .NET class.

The test script 102a and 102b next includes a series of start and end measurement functions that call the methods of the PerformanceMeasurer object e.g., "public void Setup( )", "public void Teardown( )", "public void OpenComplexDoc( )", and "public void "SaveComplexDoc( )". Each of these measurement functions include start and end measurement commands which include either a script marker or a code marker in the arguments of the measurement command. An example of a performance object start measurement command is "perfObject.StartMeasurement("WordOpen", 503, 1, 504, 1, 0, 0);" which uses the following exemplary format: StartMeasurement(String MeasurementName1,int StartMarkerID, Int AppID, Int EndMarkerID, Int AppID, Int SkipStart, Int SkipStop). In the exemplary format, MeasurementName1 is the name of the performance measurement that is being taken which identifies the testing tool 110, 112, or 114 to be used, StartMarkerID is the code marker for the start of the measurement, AppID identifies the software application 104 to measure (provided to differentiate between applications in a multi-application test scenario), EndMarkerID identifies the code marker to end the measurement, the second AppID identifies the application for the end measurement code marker, SkipStart indicates how many times the start codemarker (StartMarkerID) needs to be skipped before the measurement is taken, SkipStop indicates how many times the end code marker (EndMarkerID) needs to be skipped before the measurement is taken. The exemplary format allows measurements to begin upon encountering a code marker in a first software application and end upon encountering a code marker in a second software application, which allows very complex measurements scenarios to be created.

In the above discussed example, the "perfObject.StartMeasurement("WordOpen", 503, 1, 504, 1, 0, 0);" command is followed by the "this.objHost.Documents.Open( . . . )" command that orders the software application 104 to open the identified file. The command to the software application 104 is then followed in the exemplary test script 102 by the "End- Measurement("WordOpen", 5)" command. The "EndMeasurement("WordOpen", 5)" is an end measurement command having the format "EndMeasurement(String MeasurementName, Int TimeOut)" in which MeasurementName identifies the location of the test data, and TimeOut identifies a time out period that ends the measurement in case the Open command does not complete within the designated time in seconds.

In the exemplary embodiment, script markers may be used if no code markers have been provided in the measurement commands. For example, in the SaveComplexDoc( ) function, the start measurement command "perfObject.StartMeasurement("WordSave", 507, 1, 0, 1, 0, 0)" identifies a code marker "507" to start the measurement at, but does not identify an end measurement code marker (i.e., the EndMarkerID is set to "0"). The function next includes a command to the software application 104, in this case "SaveAs" after which a command to the performance module to end the measurement is included, "perfObject.EndMeasurement("WordSave")". The EndMeasurement command with no timeout identified then acts as a script marker that ends the measurement upon signal to the integrated test framework that the "SaveAs" command has completed. Thus, in this function, the measurement starts when a code marker (507) is encountered during the "SaveAs" procedure and the measurement ends when, after control has returned to the integrated test framework, the "perfObject.EndMeasurement("WordSave")" script command is executed. This particular example is a mixed mode scenario measurement. We use a code marker to start the measurement and the script marker to end the measurement. "0" for the EndMarkerID indicates that scenario.

In addition, each of the measurement commands may also include an identification of the testing tool for that measurement. In an embodiment, if no testing tool is identified, the benchmarking tool is used by default for that measurement. These measurement commands are inspected by the newly instantiated PerformanceMeasurer object to determine what testing tools to initialized prior to beginning the actual test. As shown in FIGS. 5a and 5b, the functions, and commands within the functions, in the test script are listed in chronological order so that each of the various operations that make up the scenario to be tested are interspersed throughout the start and end measurements commands.

At the end of the test script may be provided one or more close commands and dispose commands. For example, a close command may be provided that causes the integrated test framework to collect and output data (such as by a specified submitter module). In an embodiment, the close command may also write benchmark data to an .XML file in addition to any other output of data. A dispose command is used to close all objects instantiated by the integrated test framework or the software application during the test. The dispose command may also force a clean up of the memory used to return to the computing system to the state it was in prior to the test being performed.

Furthermore, nested measurement commands may also be used. In an embodiment, in the nested marker case you do not need to call the EndMeasurement function multiple times. Instead, you only need to call EndMeasurement( ) for the corresponding first StartMeasurement( ) call.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 6:
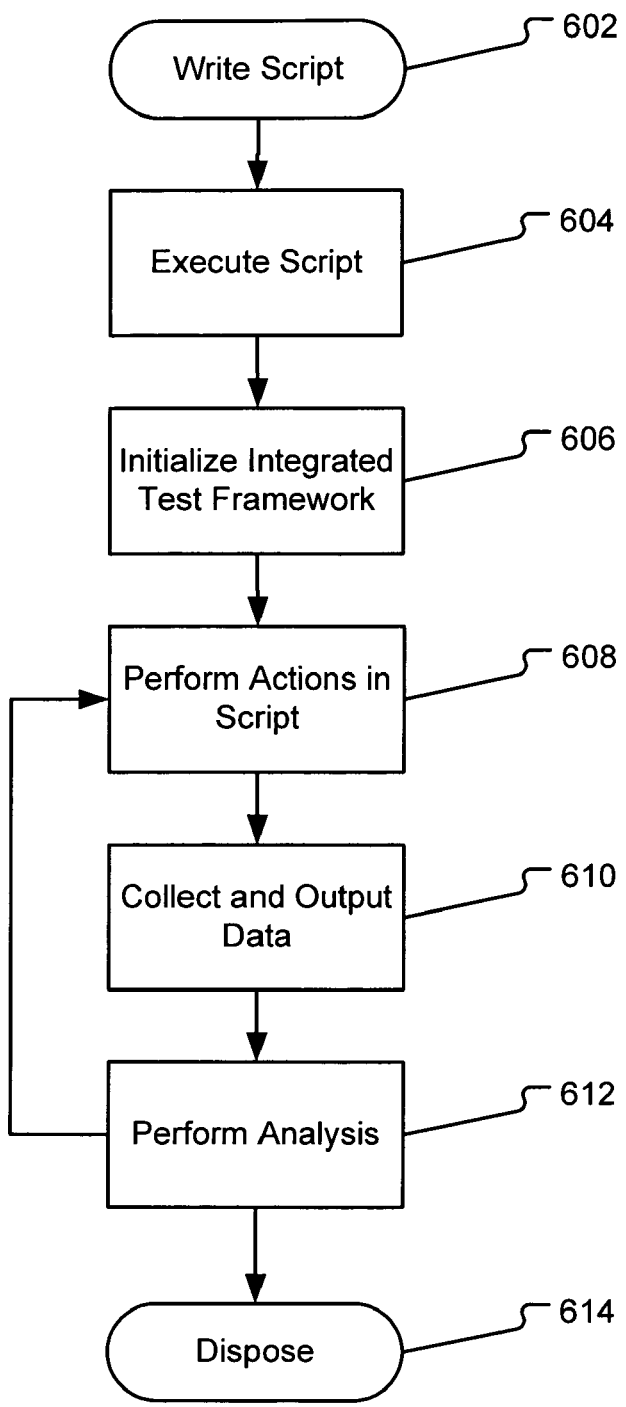
FIG. 6 is a flow diagram illustrating operation characteristics for using an integrated test framework to test a software application in accordance with an embodiment of the present invention.

FIG. 6 illustrates the operation flow for testing a software application 104. In an embodiment, the software application 104 is tested using an integrated test framework 100. The flow starts with the development of a test script by a software tester in a draft test script operation 602. The draft test script operation 602 may include determining a scenario to be tested and determining what measurements should be taken where in the scenario to obtain the information necessary to diagnose a known problem or to confirm the adequate operation of the software application. For example, the first test of a modified software application may be a simple benchmarking test of a specified scenario. If the benchmarking test fails some predetermined threshold, further tests with more elaborate scenarios may be developed or performed.

After the test script has been written, an execute test script operation 604 is performed to run the test script. As described above, the test script includes one or more commands to execute the integrated test framework, for example commands that cause the instantiation of an object of the integrated test framework class.

In response to the execute script operation 604, the integrated test framework is executed in an initialize operation 606. This operation 606 may involve instantiating an integrated test framework object or otherwise running a test manager program.

In an embodiment, the initialize operation 606 may also include initializing the software application, such as running the software application and setting it up for the first measurement as directed by the test script. In an alternative embodiment, the initialization of the software application may occur while measurements are being taken as part of the perform script actions operation 608.

The integrated test framework object may inspect the test script to determine what testing tools are called for by the test script as part of the initialize operation 606. The identified tools are then configured and executed. For example, the integrated test framework may identify that code markers are used in some measurement commands and in response cause the performance module of the software application to be loaded when the software application is executed and then cause the code markers to be written to the shared memory prior to beginning the actual testing. Configuration and execution of may require use of data, such as configuration data, associated with the testing tools and a reconfiguration of the computing environment to support the operations of the testing tool. Alternatively, configuration and execution may be as simple as instantiating objects of the identified testing tool classes.

In an alternative embodiment discussed in greater detail with reference to FIG. 7, the integrated test framework may wait to configure some or all of the testing tools until action is executed 608, rather than during the initialization operation 606. In the alternative embodiment, as each measurement command is received by the integrated test framework, the integrated test framework identifies the necessary testing tool and loads that tool in a just in time manner. In the embodiment, tools that have already been loaded need not be loaded again as long as the test script has not explicitly ended the tools execution.

Next, the specific commands in the script are carried out in a perform script actions operation 608. Each command in the script is read in turn and the actions are performed. The commands may be application commands related to an operation of the software application to be tested or may be measurement commands identifying script or code markers and the beginning or end of some measurement. Application commands for the software application are communicated to and handled by the software application through the automation system. Measurement commands are handled by the integrated test framework, which passes the commands through to the appropriate testing tool.

Ultimately, after the commands related to the testing have been performed, the integrated test script then collects the data generated by the testing tools and outputs data in an output data operation 610. This may be in response to close commands in the test script or may occur by default upon determination that no close commands are included in the test script.

In an embodiment in which an analysis capability is provided in the integrated test framework, an analysis operation 612 may occur during the execution of a test script. The analysis may be triggered by an analysis command in the test script or may occur by default. For embodiments that use analysis commands in the test script, the analysis command may contain a threshold value, such as benchmark threshold, for the scenario to be tested. The threshold value may be provided in the script or the script may contain a reference to a data structure, such a benchmarking data file, that the integrated test framework can interpret to determine what threshold to use in the analysis. The analysis operation 612, then, may involve the comparison of the threshold value with the data generated in the current test. Based on the result of the comparison, the analysis operation 612 may perform various additional tests (i.e., flow returns to the perform script actions operation 608) or the operational flow may proceed to dispose operation 614 depending on information provided in the test script.

For example, the test script may include an analysis command that causes the integrated test framework to compare the benchmarking results of the current test to some threshold benchmarking value. The analysis command may further include directions that, if the current benchmarking results are greater than the threshold, the test scenario should be repeated but with different measurement parameters or testing tools. In embodiments, the analysis may be performed by the integrated test framework; the results of the analysis then dictating whether the remaining commands in the test script should be performed or whether the flow should skip to the dispose operation 614. In an alternative embodiment, the analysis may be performed by the test script using data provided by the integrated test framework, which requires that the integrated test framework communicate specified data to the test script in some way, such as for example placing the data in a specific data structure accessible by the test script. In this case, the logic for performing the comparison may be placed in the test script.

Preferably, the operational flow ends with a dispose operation 614 that returns the computing system to the condition it was prior to running of the test script. This may include shutting down the integrated test framework, closing any instantiated objects, and exiting the software application and releasing any memory allocated or otherwise used during the test. The dispose operation 614 may occur automatically or in response to one or more dispose commands in the test script.

Figure 7:
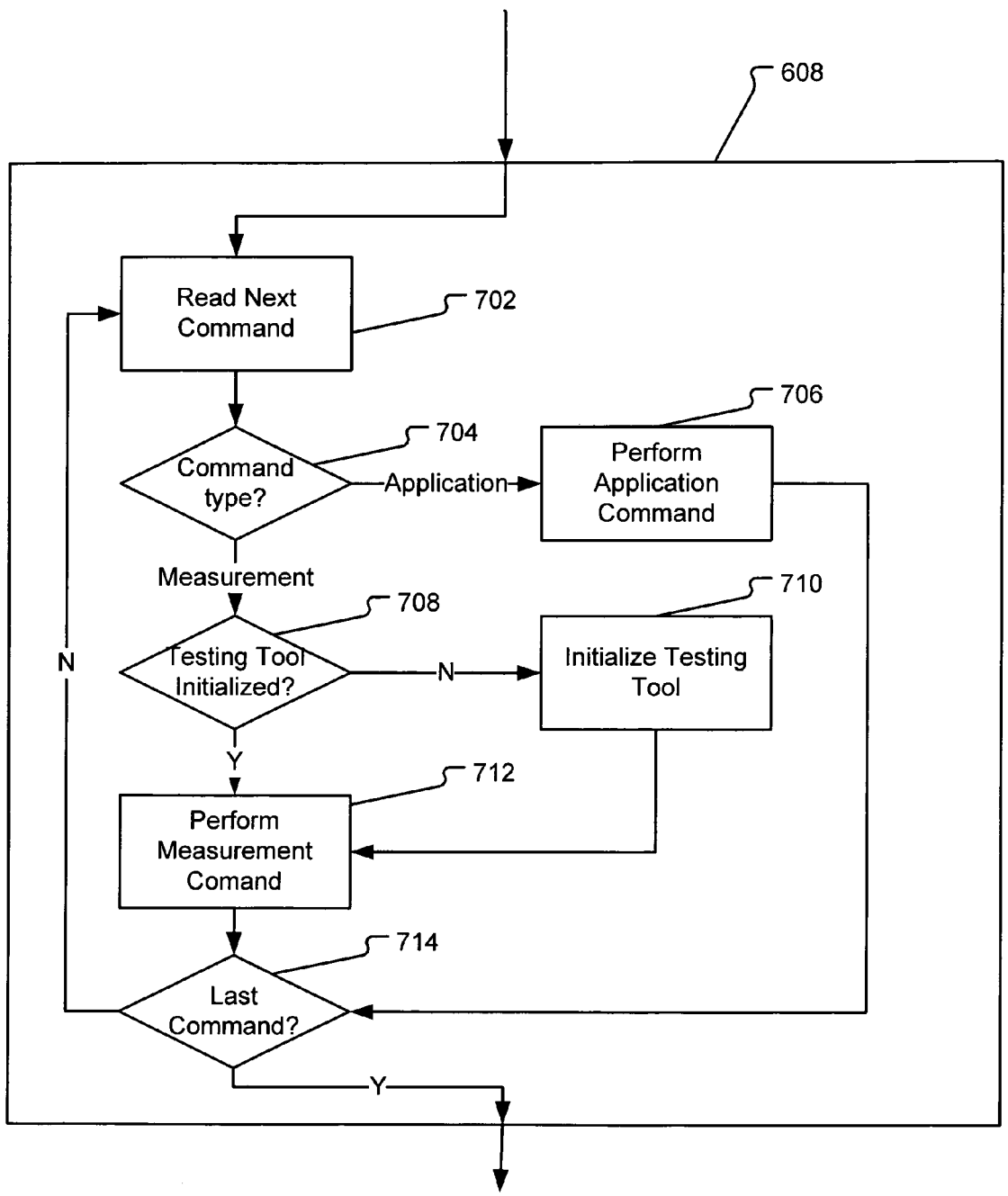
FIG. 7 is a flow diagram illustrating operational characteristics shown in FIG. 6 in more detail in accordance with an embodiment of the present invention.

FIG. 7 illustrates the operational flow within the perform script actions operation 608 for an embodiment of the present invention. In the embodiment shown in FIG. 7, the testing tools are initialized as needed in a just in time manner as they are encountered during the execution of the test script.

After initialization of the integrated test framework in initialization operation 606, the next command in the script is read in a read operation 702. For simplicity in discussion of the embodiment in FIG. 7, commands are considered to be either application commands or measurement commands. Other types of commands, e.g., initialization commands, close commands, analysis commands, dispose commands, etc., would not be considered commands with respect to FIG. 7.

After reading the next command, a determination operation 704 determines if the command is an application command or a measurement command. If it is an application command, then the command is passed to the software application in a perform application command operation 706 for execution by the software application's automation system.

If the command is a measurement command, then a second determination operation 708 determines if the testing tool necessary to perform the measurement command has already been initialized. If not, then an initialize testing tool operation 710 initializes the testing tool and the measurement command is transferred to the testing tool in a perform measurement operation 712. If the tool has already been initialized, then the measurement command is transferred to the testing tool in the perform measurement operation 712.

Measurements taken in the perform measurements operation 712 may include measurements related to script markers or code markers. If code markers are used, then that will involve the use of the performance module and shared memory associated with the software application.

After the perform measurement command operation 712 and the perform application command operation 706, a third determination operation 714 determines if any commands, i.e., application or measurement commands, remain to be executed. If so, the read next command operation 702 is repeated as described above. If no application or measurement commands remain, or if the next command is not an application or measurement command, the operational flow exits the perform script actions operation 608.

While the invention has been particularly shown and described with reference to preferred embodiments thereof, it will be understood by those skilled in the art that various other changes in the form and details may be made therein without departing form the spirit and scope of the invention.

What is claimed is:

1. A method of testing a software application comprising:
   executing a test script that identifies the software application to be tested and a plurality of measurements, wherein each measurement is associated with one of a set of testing tools;
   executing, in response to executing the test script, the software application;
   initiating, in response to executing the test script, an integrated test framework;
   initiating, by the integrated test framework, each of the testing tools associated with the plurality of measurements identified in the test script;
   performing, by the associated testing tool, each measurement of the plurality of measurements;
   receiving, by the integrated test framework, data from testing tools performing measurements; and storing first data generated from the received data as a data collection associated with the test script.

2. A method of testing a software application as described in claim 1, wherein the test script identifies a series of operations to be performed by the software application and executing the software application further comprises:
  identifying the series of operations to be performed by the software application; and
  causing the software application to perform the series of operations.

3. A method of testing a software application as described in claim 2, wherein initiating the testing tools further comprises:
  identifying, for a first measurement, the associated testing tool; and
  issuing a command to the first measurement's associated testing tool to perform the measurement.

4. A method of testing a software application as described in claim 1, wherein initiating the testing tools further comprises:
  identifying, for a first measurement, the associated testing tool; and
  issuing a command to the first measurement's associated testing tool to perform the measurement.

5. A method of testing a software application as described in claim 4, wherein the software application includes code markers embedded in the software application and wherein the plurality of measurements to be taken include at least one measurement related to an identified code marker and executing a test script further comprises:
  identifying the at least one code marker;
  initiating a performance module associated with the software application; and
  notifying the performance module of each identified code marker in the test script.

6. A method of testing a software application as described in claim 1, further comprising:
  analyzing the first data to obtain results; and
  based on the results of the analysis;
    repeating execution of the software application;
    initiating at least one additional testing tool associated with a new measurement to be taken;
    performing, by its associated testing tool, the new measurement; and
    storing second data generated by the additional testing tool as a data collection associated with the test script and the new measurement.

7. A method of testing a software application as described in claim 6, wherein the test script includes a predetermined threshold associated with an identified measurement, and wherein analyzing further comprises:
  comparing the predetermined threshold to the first data.

8. A method of testing a software application as described in claim 1, further comprising:
  translating the data received from the plurality of testing tools into a predetermined common format.

9. A method of testing a software application comprising:
  determining a series of operations for the software application to perform;
  determining a set of measurements to be taken while the software application is performing the series of operations, wherein the measurements require the use of a plurality of testing tools;
  directing an integrated test framework to execute the series of operations of the software application and to concurrently execute the plurality of testing tools to take the set of measurements; and
  receiving a data collection from the integrated test framework, the data collection including data generated by the plurality of testing tools and including data related to the set of measurements.

10. A method of testing a software application as in claim 9, wherein directing further comprises:
  creating a test script identifying the software application, the series of operations for the software application to perform; and the set of measurements to be taken.

11. A method of testing a software application with an integrated testing framework comprising:
  receiving, by the integrated testing framework, one or more commands to perform measurements in conjunction with execution of the software application;
  identifying, by the integrated testing framework, one or more testing tools from a set of testing tools, the identified one or more testing tools necessary to perform the measurements; and
  initiating, by the integrated testing framework, the identified one or more testing tools to perform measurements.

12. The method of claim 11 further comprising:
  receiving, by the integrated testing framework, data from the identified one or more testing tools after the measurement have been taken.

13. The method of claim 11 further comprising:
  directing a testing tool to begin taking a measurement;
  directing the software application to perform a predetermined operation; and
  directing the testing tool to end taking the measurement.

14. The method of claim 12 further comprising:
  analyzing the received data;
  based on the results of the analysis, repeating the directing operations.

15. The method of claim 11 further comprising:
  initiating the software application and a performance module associated with the software application;
  notifying the performance application of code markers identified in the one or more commands to perform measurements;
  directing the software application to perform a predetermined operation; and
  receiving data from the performance module.

16. A computing device comprising:
  a plurality of testing tools; and
  an integrated testing framework operable to identify testing tools from measurement commands received from a test script and execute one or more of the plurality of testing tools based on the measurement commands;
  the integrated testing framework further operable to receive data from each of the testing tools, collect the data into a data collection, and store the data collection in a data structure.

17. The software testing system of claim 16 further comprising:
  at least one test script containing a first measurement command and a second measurement command, the first measurement command associated with a first one of the plurality of testing tools, and the second measurement command associated with a second one of the plurality of testing tools.

18. The software testing system of claim 17 wherein the first measurement command includes a script marker and the second measurement command includes a code marker.

19. The software testing system of claim 16, wherein each of the plurality of testing tools are instantiations of subclasses of an integrated test framework class.

20. The software testing system of claim 16, further comprising:

a performance module associated with a software application;

a shared memory accessible by the performance module and the integrated test framework;

wherein the integrated test framework further comprises:

at least one submitter module for collecting data received from testing tools and outputting the data in a predetermined format;

at least one data store having configuration data associated with each of the plurality of testing tools and marker data for identifying code markers in a test script; and an analysis module for analyzing data received from the testing tools.

21. The software testing system of claim 16, wherein each of the plurality of testing tools is selected from a group consisting of a benchmarking tool, a profiling tool, a working set tool, and an RPC tool.

* * * * *